United States Patent [19]
Hargis

[11] 3,926,746
[45] Dec. 16, 1975

[54] ELECTRICAL INTERCONNECTION FOR METALLIZED CERAMIC ARRAYS

[75] Inventor: Billy M. Hargis, Cleveland, Tenn.

[73] Assignee: Minnesota Mining and Manufacturing Company, St. Paul, Minn.

[22] Filed: Oct. 4, 1973

[21] Appl. No.: 403,404

[52] U.S. Cl. ...................... 204/15; 29/418; 29/569; 204/46 G; 156/89; 317/101 CP; 427/89.96
[51] Int. Cl.[2] ......................................... B41M 3/08
[58] Field of Search ....... 156/89, 16, 182, 250, 252, 156/261, 264; 317/101 CM, 101 CP, 101 A; 264/58, 61, 62, 67; 29/412–414, 418, 423, 569, 583, 624, 625, 629; 117/212, 8.5; 161/DIG. 7; 204/46 G, 30, 15

[56] References Cited

UNITED STATES PATENTS

| | | | |
|---|---|---|---|
| 2,865,082 | 12/1958 | Gates | 29/418 |
| 2,893,929 | 7/1959 | Schnable | 204/46 G |
| 3,423,517 | 1/1969 | Arrhenius | 156/89 |
| 3,436,605 | 4/1969 | Landron, Jr. | 317/101 A |
| 3,518,756 | 7/1970 | Bennett et al. | 156/89 |
| 3,522,087 | 7/1970 | Lacal | 204/46 G |
| 3,618,202 | 11/1971 | Callahan et al. | 156/89 |
| 3,723,176 | 3/1973 | Theobald et al. | 117/212 |
| 3,791,938 | 2/1974 | Healy et al. | 204/46 G |

FOREIGN PATENTS OR APPLICATIONS

| | | |
|---|---|---|
| 1,263,126 | 3/1968 | Germany |

*Primary Examiner*—Douglas J. Drummond
*Assistant Examiner*—F. Frisenda
*Attorney, Agent, or Firm*—Alexander, Sell, Steldt & Delahunt

[57] ABSTRACT

Metal such as gold used for electroplating small metallized ceramic pieces is conserved by providing arrays of such pieces in which electrical interconnections crossing lines of separation of the pieces completely connect all parts to be plated in the array but are severed when the pieces are separated.

7 Claims, 8 Drawing Figures

ELECTRICAL INTERCONNECTION FOR METALLIZED CERAMIC ARRAYS

This invention relates to a method for conserving the gold used in electroplating the small ceramic pieces which are adapted for the mounting of electric devices. This invention further relates to arrays of ceramic substrates which are electrically interconnected.

In my copending application, Ser. No. 292,806 now U.S. Pat. No. 3,864,810, are described sets of small ceramic chip carriers which are electrically interconnected to assist in electroplating. Such chip carriers usually involve only a few leads, often three and only relatively small surfaces of similar areas to be electroplated. It was found that by constructing the chip carriers in sets of at least four, preferably about 10, it was easier to manipulate the pieces and they could then be separated by grinding away the base which at the same time ground away the buried electrical interconnections.

Although grinding a portion of the ceramic presents no particular problem for very tiny parts, many ceramic substrates and particularly package units are sufficiently large that such an operation is not convenient and furthermore such package units include many more small surface areas to be gold plated usually in conjunction with at least one area which may be 20 to 100 times as large as the individual small surface areas. Usually barrel plating procedures are used for such package units so that there is a strong tendency to build up heavy gold deposits (of the order of 0.02 to 0.08 mm. thick) on the larger surface areas while attaining the much thinner gold deposit (of a thickness of about 0.001 to 0.002 mm.) on the smaller surface areas. In addition to the wastage of the very expensive gold in the heavy deposits which cannot be reclaimed, there is a considerable amount of gold plated onto the shot used in barrel plating which can be recovered in great part only by extra effort. In short, then, although procedures for making small ceramic substrates are available, costs are affected by losses of gold in the procedures over what is actually fully adequate for the electrical requirements. This can be a substantial factor in producing large numbers of such articles.

One object of this invention is to provide economies in the gold plating of partially metallized ceramic substrates. Other objects will become evident herein.

In accordance with the above and other objects of the invention it has been found that increased efficiency in the use of gold is achieved by so constructing an array of metallized ceramic substrates particularly packaging units, having a multiplicity of external terminals and internal terminals connected thereto, as well as having internal mounting pads, that means are provided for separation of ceramic substrates from one another and from margins and gutter pieces along predetermined lines of separation and interconnections are provided between external terminals of adjacent parts and between pads of adjacent parts crossing lines of separation and a metallized collector is provided to which contiguous external terminals and pads of contiguous parts are connected. The metallized collector can be in the margins of the array on one or more sides and can surround the ceramic parts and can also be applied to gutter strips between parts. The gutter strips and margins are discarded when the pieces are finally separated. It will be seen that when all separation means are exercised, the ceramic parts will be individually free from short circuits but that until that time, the metallized collector can be contacted at any point to provide electrical charge at any metallized unit in the array and, inasmuch as resistance over the array is not great, electroplating may be applied to all exposed metallized surfaces at one time giving a ceramic array uniformly gold plated on all receptive surfaces. It is preferred to provide a single position for connection to the metallized collector and have the remainder masked against plating.

The arrays of the invention and the process for construction may be accomplished using any desired fired or unfired substrate for ceramic packages or parts. In particular, the use of alumina of purities of 90% and more is preferred for such purposes but materials possessing superior properties in one way or another may be used. Thus, beryllia may be used for superior heat conductivity, titania or titanates for high dielectric strength, black ceramics may be used where no light emission or penetration is desired. Conventional metallizing is used such as tungsten, moylbdenum-manganese, palladium, platinum, etc.

It is contemplated that substantially any design of ceramic package can be formed in arrays according to the invention from relatively large ones in which no more than four may be handled in the array to small ones of which there may be several hundred in the array. As an example, in an array about 115 by 85 mm. there may be over 300 small packages about 4 mm. square with several thousand interconnected terminals and pads. It is further contemplated that arrays of the invention may be constructed using a single sheet on which all metallizing is screened and then an insulating layer of the same ceramic composition is screened over those portions which need not be electroplated or arrays may be constructed using two or more green ceramic sheets which are adhered and fired to an integral ceramic structure with metallizing on the lower sheet or on several sheets even on all sheets and suitably connected between levels by via holes or edge metallizing as desired. It is thus contemplated that arrays of the invention may be made in many ways.

The means for separation of the individual packages or units, including marginal portions of the array, are also subject to several alternative variations. A convenient procedure is to provide perforations through at least one layer of the array along the lines of desired separation. It is not necessary that the perforations extend through all layers but they may. The individual parts can then be snapped apart. Another alternative is to provide dink lines along the predetermined lines of separation. Dink lines are cut into the green ceramic before firing, suitably to about one third the thickness of the material, and after firing provide an excellent line of separation. It is only necessary to avoid cutting the line so deep as to sever electrical connections. If desired, both perforation and dinking may be employed together. A further alternative is to provide no perforations or dink lines but to cut grooves with a laser beam in the ceramic itself or such grooves may be employed together with perforations. Because a multilayer package, one composed of several layers of green ceramic, is likely to be thinner in the central enclosed area a suitable means for separation parts is very helpful in reducing wastage caused by improper breaking as are also proper procedures for exercising the means.

A metallized collector or band is provided, preferably around at least a part of the periphery of the array, as described above to provide a lead to all parts and the electroplating lead is attached to it. This may be on the uppermost layer or buried in the ceramic except for a location for connection of the electroplating lead. This latter procedure is more conservative of gold in the electroplating operation. Likewise, leads between layers may be such that only one metallized collector is needed but at least one metallized collector is necessary.

A part of the interconnections between external terminals of adjacent ceramic parts are more or less diagonal although they may cross lines of separation at right angles and preferably do. In addition, external terminals are connected to the closest terminal of the adjacent ceramic piece, for example, by edge overlap of the perforation as well as to the terminal of the adjacent ceramic piece on the side thereof. In this way, conductive paths proceed more or less diagonally through the array and directly across it to connect to the metallized collector. Diagonal interconnections may be distinguished as offset interconnections as opposed to connections between the closest adjacent terminals. Any other pattern of making interconnections may be used which assures that all parts are connected in the array and none are connected (except as desired) in the separated package units. When individual packages are separated, the offset interconnections are visible along the edge usually as a slight gray mark. Although gold plated parts are readily wet by the usual solders, the gray metallized areas are not and they thus introduce no danger of electrical short circuits between adjacent terminals.

The invention having now been described in broad general terms, it is now more particularly described by reference to the drawings herewith wherein.

Figure 5:
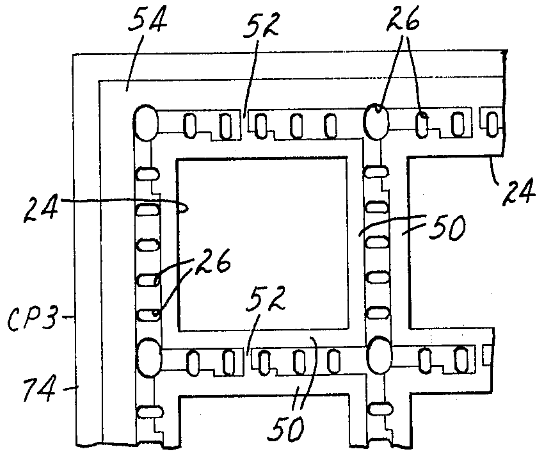
Figure 6:
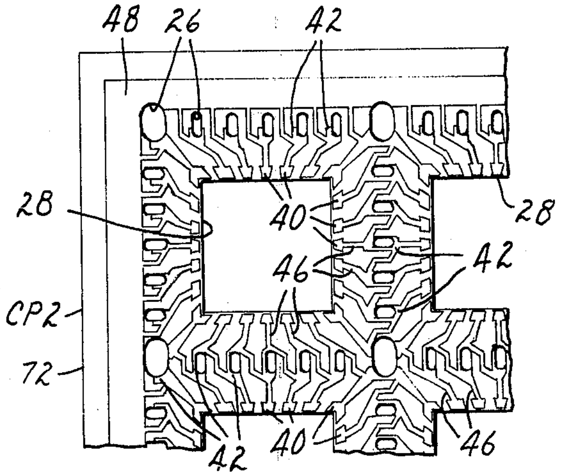
Figure 7:
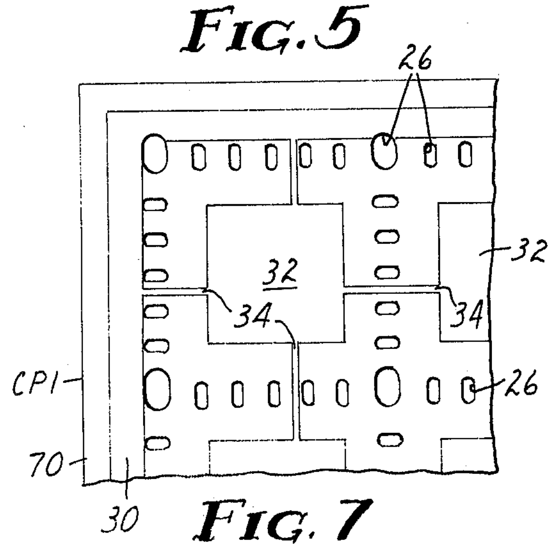
Figure 8:
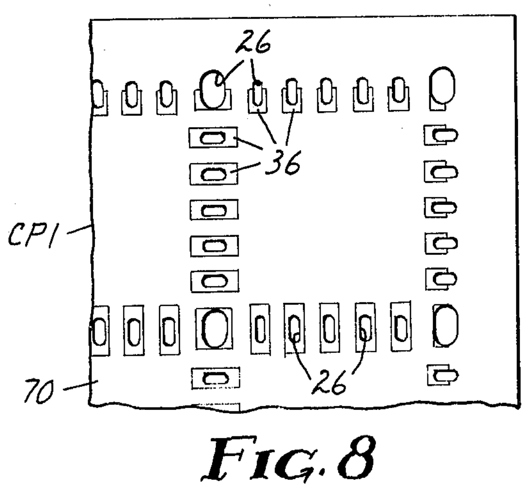

FIGS. 5, 6 and 7 are surface views of the green sheets of ceramic planes 1, 2 and 3 and FIG. 8 is a surface view of the back of ceramic plane 1.

Figures 3, 4:
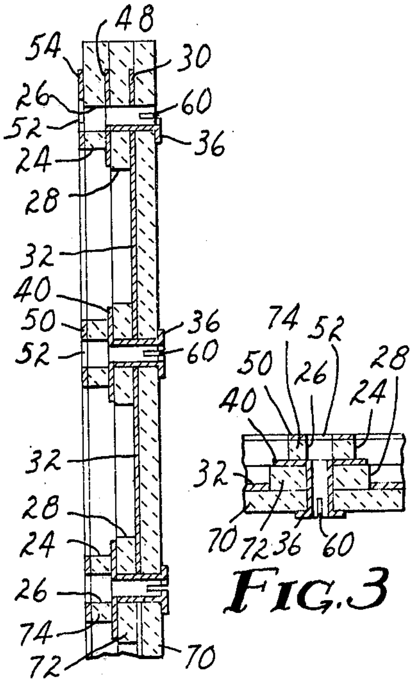
FIG. 3 is an enlarged cross-section of the array of FIG. 2 taken at line 3—3.
FIG. 4 is a cross-section taken at line 4—4 of the array of FIG. 2.

Referring to the drawings, CP1 designates ceramic plane 1 and CP2 and CP3 designates planes 2 and 3 respectively, the metallizing on each plane (and on the edges of perforations) is designated generically as MP1, MP2 and MP3 respectively and is most easily seen in the cross-sectional FIGS. 3 and 4. It will be recognized that as shown, the metallizing is somewhat schematic as it is actually very thin and, when the several green sheets or planes of unfired ceramic are consolidated or laminated to give a composite, the green ceramic and metallizing accomodate one another so that there is no significant bulging. It will also be recognized that the invention is here illustrated in a package unit in which three ceramic green sheets are employed but that it may also be used with only one or two sheets or with four and up to as many as ten or even more.

In application Ser. No. 292,806, use was made of a base sheet which was eventually ground away and it was contemplated that individual green devices, by which was meant that part of the total which would eventually make one device such as a chip carrier would be electrically and ceramically joined together in cojunct groups of about the size of 10 units, but larger or smaller such groups were obviously possible from groups of 3 or 4 upward.

In the present invention, the operation of grinding is avoided and other methods of separating individual pieces in packages are used as noted above while retaining the convenience of interconnecting individual pieces comprised in large conjunct groups termed arrays.

In application Ser. No. 292,806, it was particularly contemplated to work with groups of about 10 which were relatively small in actual size and were referred to as sets. In that application sets were separated from a larger sheet for firing and after firing it was found that sets were further convenient in manipulation of such small devices because a set produced according to the process of that invention could be electroplated using a single connection and was more easily handled for the mounting of chips and encapsulation.

In the present invention, although arrays could be made of relatively small size and are contemplated of any size desired, it is most convenient to form them in a relatively larger size, from about 50 × 75 mm. to about 125 × 200 mm., and work with the entire array at one time. It is rather surprising that sufficiently good electrical connections can be maintained using many relatively fine interconnections in a network so that uniform electroplating is possible over the entire array. It is an additional advantage of such an array that the plating operation detects any discontinuities and unconnected reference spots can remain unplated.

Referring again to the drawings, the green ceramic sheets shown in FIGS. 5, 6, 7 and 8 will be seen to be portions of larger sheets. Because of the small sizes of the individual pieces which may be of the order of about 4 mm. square or more or less, an array of these pieces may include very many individual pieces and would be merely confusing if shown in totality and accordingly only small parts of an array are shown very much enlarged. In producing the array, it is necessary to exercise proper care for registry between layers or sheets as is known to those in the art. The sheet material for each layer is of the order of 0.2 to 0.3 mm. thick and may be made using any of the usual ceramic compositions such as alumina of 90 to 99.9% of higher purity, beryllia, or other suitable compositions which may include ingredients conferring color or making the ceramic black or opaque as desired. Thicker single sheets are conveniently made by adhering two or more thinner sheets. This invention is not concerned especially with the particular ceramic, but for general utility alumina of about 94% or greater purity is preferred.

It will be noted that in FIGS. 3 and 4 the sectioning shows refractory because there are sections of a fired piece. Because the sheet material of the green ceramic of FIGS. 5 through 8 partakes of the properties of the polymeric binder used, sections of those parts would show the sectioning lines for plastics.

Figure 1:
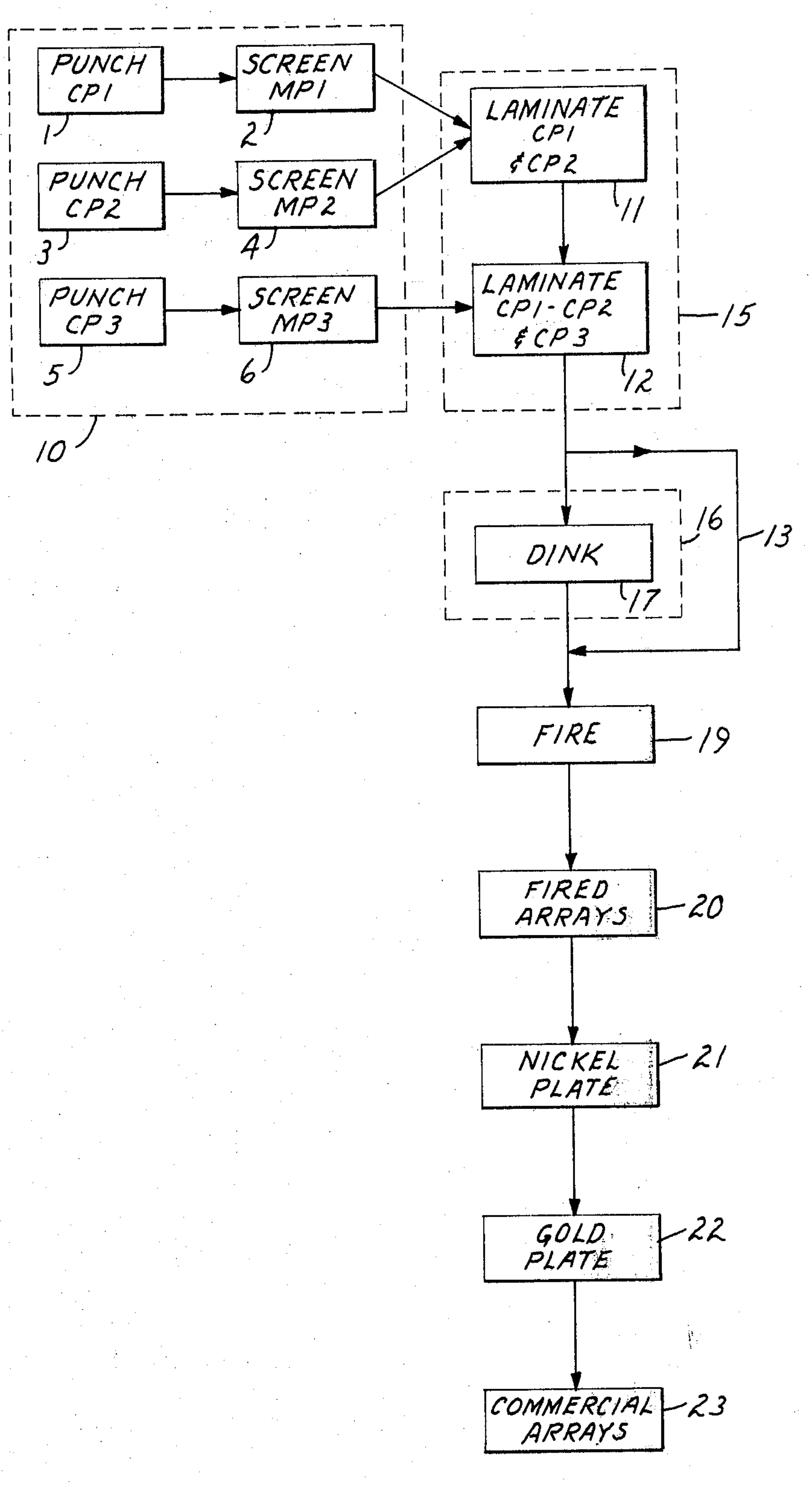
FIG. 1 is a flow sheet showing mechanical and process steps included in constructing an array of the invention.
Figure 2:
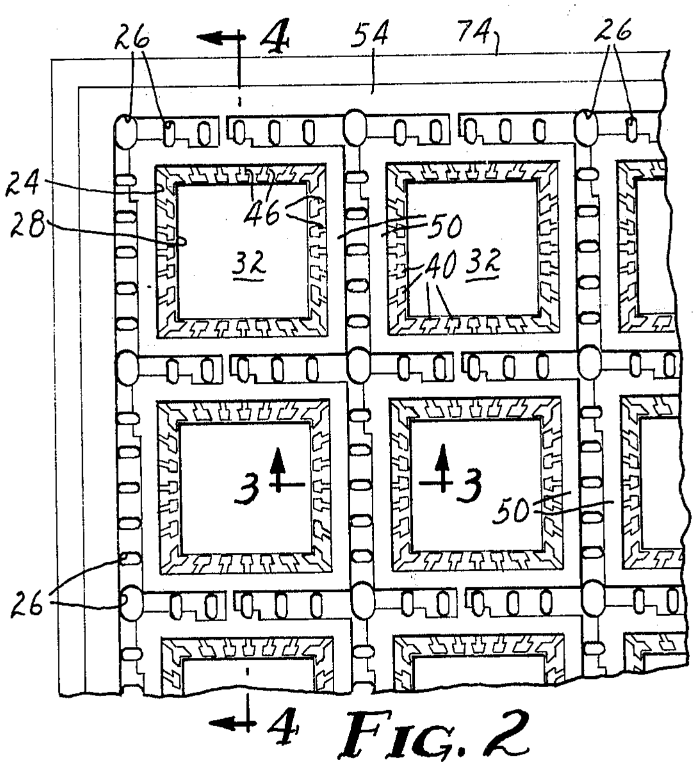
FIG. 2 is a plan view of an array of the invention.

Reference is now made to FIG. 1 which shows the process of the invention which leads to arrays of the invention as produced for commerce.

The first step in constructing an array of the invention is to provide the desired number of green ceramic sheets and screen each sheet with its particular metallizing. It will be seen that the boxes within broken line Box 10 represent this step of the invention, Boxes 1, 3 and 5 are respectively marked "punch" for CP1, CP2, and CP3 indicating cutting out green sheets from a green ceramic tape as described by Park in U.S. Pat. No. 2,966,719, and making appropriate holes which may include perforations used to provide means for separation of individual pieces. The sheet for this purpose is desirably rather thin, for example, 0.2 to 0.3 mm. but depending on the structure being made may be less or more. Boxes 2, 4 and 6 are marked "screen" for MP1, MP2 and MP3 respectively referring to screen printing with metallized compositions of the respective patterns. This screening will normally provide overflow into holes giving edge overlap as well as filling via holes. It is also possible in the screening to avoid edge overlap when desired along relatively long edges. The metallizing compositions may be of any type such as molybdenum-manganese, tungsten, platinum, or other metals compatible with the particular ceramic.

Broken line Box 15 includes the second step of construction in which an array of green interconnected multilayer devices are constructed by successive lamination of the several layers in registry. In Box 11 the first operation is "Laminate" CP2 to CP1 and in Box 12, "Laminate" CP1-CP2 with CP3.

The third step, indicated by broken line Box 16 and Box 17 of the flow diagram of FIG. 1 is to "Dink". This step is the cutting of grooves along lines of separation in the back of the array while substantially retaining edge-metallizing which has penetrated perforation holes (MP1 and MP2) as well as the electrically connecting network of MP1. If desired when other means for separation are provided, such as leaving space for separation using laser scribing or cutting, this step is bypassed as shown by lead 13. As noted above, perforations may be provided and these are produced by the punching operations in Boxes 1, 3 and 5.

The fourth and following steps include firing the sheet to maturity as indicated by "fire" in Box 19. This provides the "fired arrays" indicated in Box 20 which one may "nickel plate" in Box 21 and "gold plate" in Box 22 to provide "commercial arrays" in Box 23. Alternative plating schedules will be apparent to those skilled in the art. The plated commercial arrays are not shown in the figures as they would only be distinguishable by the plated layers of metal.

The arrays are ready after plating for the manufacturer who (1) mounts an electronic device in each package, (2) wire bonds the device to the leads in the package and, (3) embeds or encapsulates the device. There is found to be increased convenience in handling such arrays. The package units shown in FIGS. 2–8 are encapsulated by soldering a lid. At this point, a simple separation of the individual packages in the array is effected by snapping apart along the separation lines provided either by perforations or dink lines or other means.

FIGS. 5, 6 and 7 show portions only here represented as corners of the sheets provided for CP3, CP2 and CP1 respectively. It would be within the scope of the invention to provide only one or two of these green sheets suitably metallized or to provide more such green sheets depending on the particular design which is sought. It is also within the scope of the invention to employ variations in metallizing in any or all planes to comport with the desired device. Such variations will be readily apparent to those of skill in the art. The important aspect of the metallizing is that an interconnection network is provided.

A package unit as shown in the arrays of FIGS. 2–8 comprises a ceramic substrate and numerous internal and external terminals. In FIGS. 2–8, the ceramic substrate is made from three layers designated CP1, CP2 and CP3 and also as 70, 72 and 74. In each layer, it will be seen that perforation holes 26 are provided. The metallized pattern MP1 on sheet 70 is composed of a metallized collector 30, pads 32 and interconnection leads 34 on the upper surface and by metallization on the walls of holes 26 make connection with edge overlap 36 on the bottom surface.

The metallized pattern on sheet 72 in which are square holes 28 is composed of internal terminals 40, external terminals including edge overlap 42, interconnections 46 and metallized collector 48. It will be recognized that the edge overlap of connections 36 and metallized connector 30 will make contact with the edge overlap of terminals 42 so that these are all connected by interconnections 46. It is the network of interconnections 46 particularly which is essential for the operation of this invention.

The metallized pattern of sheet 74 having square hole 24 is composed of square pads 50, interconnections 52 and metallized collector 54. If desired, provision can be made to avoid the use of metallized collector 54 on the top layer by use of suitable vias to leads at a lower level or plating of the collector can be prevented by masking. Contact to collector 54 is by clipping and to other collectors may be by a wire inserted through a perforation.

The green sheets 70 and 72 are laminated together under slight pressure as shown in FIG. 1, followed by sheet 74 and then the dink lines 60 which are only visible in the cross-sectional views FIGS. 3 and 4 of the fired array. These would not be cut in the green sheet of FIGS. 7 and 8. It will be noted that these only form one means for separation of the units and as such are not necessary when perforations 26 are employed.

What is claimed is:

1. The process for providing uniform gold plating to ceramic substrates having multiplicities of internal and external terminals and internal pads comprising the steps of I. constructing an array of said substrates having an at least partial margin of ceramic from at least one sheet of fired or unfired ceramic having desired patterns of metallization for said substrates thereon, said array comprising;

A. spaces at least between said substrates and between substrates and margins for separation of said substrates from one another and from margins of said array along predetermined lines of separation, said array further comprising B. at least one metallized collector and C. interconnections between external terminals of adjacent substrates and between pads of adjacent substrates and between external terminals and pads of substrates adjacent said metallized collector and said metallized collector, said interconnections crossing lines of separation, II. firing said array to maturity of the ceramic and III. electroplating said array with gold whereby a ceramic array uniformly gold plated on all receptive surfaces is obtained.

2. The process according to claim 1 wherein the metallized collector is in a margin at least partially surrounding ceramic substrates of the array.

3. The process according to claim 1 wherein the spaces for separation of ceramic substrates include perforations with at least partial edge overlap metallizing.

4. The process according to claim 1 wherein the spaces for separation of ceramic substrates include dinking lines.

5. The process according to claim 1 wherein at least one gutter with metallized collector is provided between adjacent rows of substrates and adjacent substrates are interconnected to said metallized collector from pads and external terminals.

6. A ceramic array produced by the process of claim 1 and uniformly gold plated on all receptive surfaces.

7. The process according to claim 1 wherein masking is provided to bury portions of exposed metallizing.

* * * * *